US009646791B2

(12) United States Patent
Ozaki et al.

(10) Patent No.: US 9,646,791 B2
(45) Date of Patent: May 9, 2017

(54) CIRCUIT BREAKER DEVICE

(71) Applicant: HONDA MOTOR CO., LTD., Tokyo (JP)

(72) Inventors: Yuusuke Ozaki, Utsunomiya (JP); Tohru Kuribayashi, Shioya-gun (JP); Taichi Ogawa, Utsunomiya (JP); Kaoru Fukui, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 14/443,318

(22) PCT Filed: Nov. 7, 2013

(86) PCT No.: PCT/JP2013/080152
§ 371 (c)(1),
(2) Date: May 15, 2015

(87) PCT Pub. No.: WO2014/125685
PCT Pub. Date: Aug. 21, 2014

(65) Prior Publication Data
US 2016/0042900 A1    Feb. 11, 2016

(30) Foreign Application Priority Data

Feb. 14, 2013  (JP) .................... 2013-027081

(51) Int. Cl.
*H01H 50/64*  (2006.01)
*B60L 11/00*  (2006.01)
(Continued)

(52) U.S. Cl.
CPC .............. *H01H 50/64* (2013.01); *B60L 11/00* (2013.01); *H01H 21/30* (2013.01); *H01H 50/54* (2013.01); *H01H 73/08* (2013.01); *B60L 3/00* (2013.01)

(58) Field of Classification Search
CPC ........ H01H 50/64; H01H 21/30; H01H 50/54; H01H 73/08; B60L 11/00; B60L 3/00
See application file for complete search history.

(56) References Cited

U.S. PATENT DOCUMENTS 3,876,909 A * 4/1975 Halbach ................. H01H 71/32
322/12
8,410,389 B2 * 4/2013 Trussler .................. H01H 3/26
218/154

(Continued)

FOREIGN PATENT DOCUMENTS

CN         1949658 A       4/2007
CN       201898245 U       7/2011
(Continued)

OTHER PUBLICATIONS

International Search Report dated Dec. 24, 2013 issued in corresponding application No. PCT/JP2013/080152.
(Continued)

*Primary Examiner* — Zeev V Kitov
(74) *Attorney, Agent, or Firm* — Westerman, Hattori, Daniels & Adrian, LLP

(57) ABSTRACT

A circuit breaker device is provided with a main contactor part that can switch between connection and disconnection of a battery and a circuit, and a circuit breaker (10a) that can disconnect the battery. The circuit breaker (10a) is provided with: a connector connection part (41b) having a pair of connector circuit terminals (41bp, 41bn) related to passing electricity through a coil for the main contactor part; a connector (43) that is attachable to and detachable from the connector connection part (41b) and has a connector shorting terminal (43a) that shorts the pair of connector circuit terminals (41bp, 41bn) upon attachment to the connector connection part (41b); and a claw part (44a) for restricting attachment of the connector (43) to the connector connection part (41b).

4 Claims, 9 Drawing Sheets

(51) Int. Cl.
    *H01H 21/30*     (2006.01)
    *H01H 73/08*     (2006.01)
    *H01H 50/54*     (2006.01)
    *B60L 3/00*     (2006.01)

(56) References Cited

FOREIGN PATENT DOCUMENTS

| | | |
|---|---|---|
| CN | 102612726 A | 7/2012 |
| JP | 2002343198 A | 11/2002 |
| JP | 3640682 B2 | 4/2005 |
| JP | 2005-142107 A | 6/2005 |
| JP | 2007-124813 A | 5/2007 |
| JP | 2008-312396 A | 12/2008 |
| JP | 2011-88598 A | 5/2011 |

OTHER PUBLICATIONS

Notice of Allowance dated Nov. 17, 2015 issued in counterpart JP patent application No. 2015-500092, with English translation. (6 pages).

Office Action dated Jun. 3, 2016, issued in counterpart Chinese Patent Application No. 201380059332.0, with Partial English translation. (10 pages).

* cited by examiner

CIRCUIT BREAKER DEVICE

TECHNICAL FIELD

The present invention relates to a circuit breaker device. Priority is claimed on Japanese Patent Application No. 2013-027081, filed Feb. 14, 2013, the contents of which are incorporated herein by reference.

BACKGROUND ART

Heretofore, there is known a control device that is provided with a relay capable of switching between connection and disconnection between a power supply circuit and an electrical load, a plug capable of disconnecting the power supply circuit (safety plug, service plug), and a contact point capable of switching between connection and release according to attachment/detachment of the plug, and that controls opening/closing of the relay according to opening/closing of the contact point (for example, refer to Patent Documents 1 and 2).

PRIOR ART DOCUMENTS

Patent Documents

Patent Document 1 Japanese Patent No. 3640682
Patent Document 2 Japanese Unexamined Patent Application, First Publication No. 2011-88598

SUMMARY OF INVENTION

Problems to be Solved by the Invention

Incidentally, according to the control device of the conventional technique above, when disconnecting the power supply circuit by pulling out the plug, it is necessary to switch the relay from connection to release before the power supply circuit is disconnected. Consequently, it may be necessary in some cases to perform cumbersome controls to provide a predetermined length of time difference between the disconnecting timing of the power supply circuit and the switching timing of the relay, or switch the relay from connection to release immediately after detecting release of the contact point.

Aspects of the present invention take into consideration the above circumstances, with an object of providing a circuit breaker device that simplifies required control and that is capable of appropriately disconnecting the circuit.

Means for Solving the Problem

In order to solve the above problems and achieve the object, the present invention employs the following measures.
(1) A circuit breaker device of an aspect of the present invention is a circuit breaker device comprising: a power supply; a circuit that is connected to the power supply; a switch that is capable of switching between connection and disconnection between the power supply and the circuit; and a circuit breaker that is capable of disconnecting the power supply. The switch is provided with a driving part that switches between connection and disconnection between the power supply and the circuit, according to an energization state. The circuit breaker is provided with: a main body connection part that has a pair of circuit terminals connected to the power supply; a connector connection part that has a pair of connector circuit terminals involved in energization of the driving part; a main body that can be attached to and detached from the main body connection part, and that has a shorting terminal capable of shorting the pair of circuit terminals in a state of being attached to the main body connection part; a connector that can be attached to and detached from the connector connection part, and that has a connector shorting terminal that shorts the pair of connector circuit terminals when attached to the connector connection part; and a restriction member that restricts attachment of the connector to the connector connection part.
(2) In the aspect of (1) above, the restriction member may be such that: it is arranged between the connector being detached from the connector connection part and the connector connection part; it stops displacement of the connector by coming into contact with the connector that is displaced toward the connector connection part, and its contact with the connector is released by means of a predetermined external force acting thereon.
(3) In the aspect of (2) above, the connector may be able to rotate about a supporting point supported by the main body, and this rotation switches between attachment to and detachment from the connector connection part. The restriction member may be supported on the main body so as to be able to be housed within the main body, it may be brought into contact with the connector that is detached from the connector connection part by being biased so as to project toward the outside of the main body, and it may be housed within the main body by means of the external force against the biased force acting thereon.
(4) In the aspect of (3) above, the restriction member may be housed within the main body by means of an external force acting thereon as a result of contact with the connector rotating in one direction, and it may be not housed within the main body by means of an external force acting thereon as a result of contact with the connector rotating in the other direction.

Advantageous Effects of the Invention

According to the aspect of (1) above, the state of energization of the driving part that drives the switch can be changed according to attachment or detachment of the connector to or from the connector connection part, and it is possible, without requiring cumbersome controls or complex configurations, to appropriately switch between connection and disconnection between the power supply and the circuit.

Furthermore, it is possible, by providing the restriction member, to prevent the energization state of the driving part from changing easily. As a result, it is possible to prevent, for example, a phenomenon in which excessively high current flows into the switch as a result of the power supply and the circuit being easily re-connected immediately after the switch switching them from connection to disconnection.

In the case of (2) above, restriction of the restriction member can be released by means of a predetermined external force such as a pressing force of a pressing operation performed by an operator, and it is possible to precisely prevent the energization state of the driving part from being easily and automatically changed.

In the case of (3) above, it is possible to appropriately switch between connection and disconnection between the power supply and the circuit while preventing the configuration from becoming complex.

In the case of (4) above, it is possible to appropriately switch between connection and disconnection between the power supply and the circuit while preventing the configuration from becoming complex.

DESCRIPTION OF THE EMBODIMENTS

Hereunder, a circuit breaker device of an embodiment according to the present invention is described, with reference to the accompanying drawings.

A circuit breaker device 10 of the present embodiment is equipped in a power supply system 1 that is mounted, for example, on an electric vehicle, and it is provided, for example, with a circuit breaker 10a such as a service plug capable of disconnecting supply of electric power from a power supply.

Figure 1:
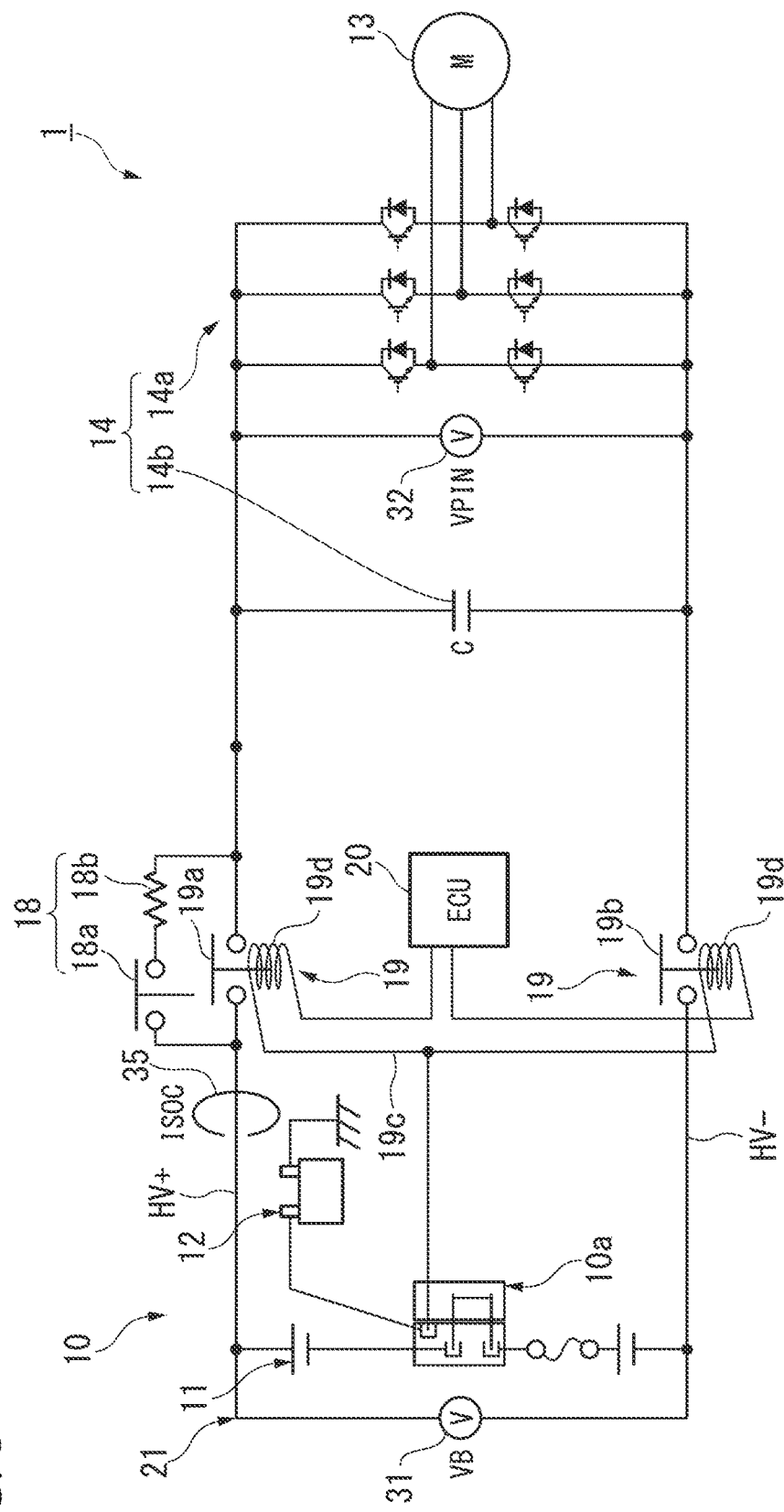
FIG. 1 is a configuration diagram of a power supply system that is provided with a circuit breaker device of an embodiment of the present invention.

For example, as shown in FIG. 1, the power supply system 1 of the present embodiment is configured with; a circuit 21 that connects the circuit breaker 10a, a battery 11 (power supply) serving as a power supply, a 12V battery 12, a traveling motor 13, an inverter 14, a precharge part 18, a main contactor part 19 (switch), and a control device (ECU) 20.

The circuit breaker device 10 includes, for example, the circuit breaker 10a, the battery 11, the 12V battery 12, the precharge part 18, the main contactor part 19, and the control device (ECU) 20.

The battery 11 is, for example, a high voltage lithium-ion secondary battery, and is connected in parallel to the inverter 14 via the main contactor part 19.

The 12V battery 12 is, for example, a low voltage lead storage battery, and is connected to a driving circuit 19c of the main contactor part 19 via the circuit breaker 10a.

The traveling motor 13 is, for example, a DC brushless motor of three phases, namely U phase, V phase, and W phase, and performs the driving operation according to the phase current of the alternating current supplied from the inverter 14. Moreover, the traveling motor 13 performs a power generation operation (regeneration operation) by a driving force being transmitted from the driving wheel side when the vehicle is decelerating.

The inverter 14 is provided for example with; a bridge circuit 14a that uses a plurality of switching elements such as transistors in a bridge connection, and a smoothing capacitor 14b. For example, when the traveling motor 13 is performing the driving operation, the inverter 14 switches between ON (conducting) and OFF (disconnection) of each of the pairs of switching elements of each phase, based on pulse-width modulation (PWM) signals output from the control device 20. Thereby, the direct current power supplied from the battery 11 is converted into three-phased alternating current power, and electric power conduction to the coil of each phase of the traveling motor 13 is sequentially commutated to thereby conduct each alternating phase current. On the other hand, for example, when the regeneration operation of the traveling motor 13 is performed, the inverter 14 switches each switching element ON (conducting)/OFF (disconnection) according to the gate signal synchronized based on the rotation angle of the rotor of the traveling motor 13, and it converts generated electric power of alternating current output from the traveling motor 13 into direct current power.

The precharge part 18 is configured, for example, with a precharge conductor 18a and a precharge resistor 18b connected in series, and is connected to both ends of the main contactor 19a on the positive side (that is to say, in parallel with the main contactor 19a).

The main contactor part 19 is configured, for example, with a positive side main contactor 19a, a negative side main contactor 19b, and a driving circuit 19c.

The positive side main contactor 19a is connected to the positive terminal of the battery 11 at the positive side high voltage line (HV+). The negative side main contactor 19b is connected to the negative terminal of the battery 11 at the negative side high voltage line (HV−). The main contactors 19a and 19b are, for example, electromagnetic switches, and are provided with a coil that is connected to the driving circuit 19c. The main contactors 19a and 19b are brought into the connection state by electromagnetic force generated at the coil 19d (driving part) as a result of energization from the driving circuit 19c, and are brought into the release (disconnection) state when energization from the driving circuit 19c to the coil 19d is stopped and no electromagnetic force is being generated.

The driving circuit 19c is connected to the 12V battery 12 via the circuit breaker 10a, and it is connected to the coil 19d of the main contactors 19a and 19b and to the control device 20. With the 12V battery 12 serving as a power supply, the driving circuit 19c is capable of supplying electric power to the coil 19d of the main contactors 19a and 19b, according to the control of the control device 20.

The control device 20 (ECU: electronic control unit) controls operations of the power supply system 1 based on the inter-terminal voltage VB and current ISOC of the battery 11, and the primary side inter-terminal voltage VPIN of the inverter 14.

Accordingly, the control device 20 receives input of detection result signals output from the respective voltage sensors 31 and 32 that detect the respective inter-terminal voltages VB and VPIN, and input of detection result signals output from a current sensor 35 that detects current ISOC. The control device 20 receives supply of electric power from the 12V battery 12 by a circuit (not shown in the figure) other than the driving circuit 19c of the main contactor part 19.

For example, as shown in FIG. 2A through FIG. 2D, the circuit breaker (service plug) 10a is provided with a base part 41, a main body 42 that can be attached to and detached from a main body connection part 41a of the base part 41, a connector 43 that can be attached to and detached from a connector connection part 41b of the base part 41, and a lock mechanism 44.

The main body connection part 41a of the base part 41 is provided with a pair of circuit terminals 41ap and 41an connected to the positive side and the negative side at the middle point of the battery 11. The connector connection part 41b of the base part 41 is provided with a pair of connector circuit terminals 41bp and 41bn connected to the positive terminal of the 12V battery 12 and the driving circuit 19c of the main contactor part 19.

The main body 42 is provided with a shorting terminal 42a that can short the pair of circuit terminals 41ap and 41an of the main body connection part 41a of the base part 41.

The connector 43 is provided with a connector shorting terminal 43a that can short the pair of connector circuit terminals 41bp and 41bn of the connector connection part 41b of the base part 41. For example, the connector 43 is supported on the main body 42 at a supporting point 43b, and can rotate about this supporting point 43b. The connector 43 is formed so as to be able to switch between connection and release between the pair of connector circuit terminals 41bp and 41bn of the connector connection part 41b and the connector shorting terminal 43a by means of rotation about the supporting point 43b. Furthermore, the connector 43 is formed so as to be able to switch between connection and release between the pair of circuit terminals 41ap and 41an of the main body connection part 41a and the shorting terminal 42a by means of rotation about the supporting point 43b.

Figure 2A:
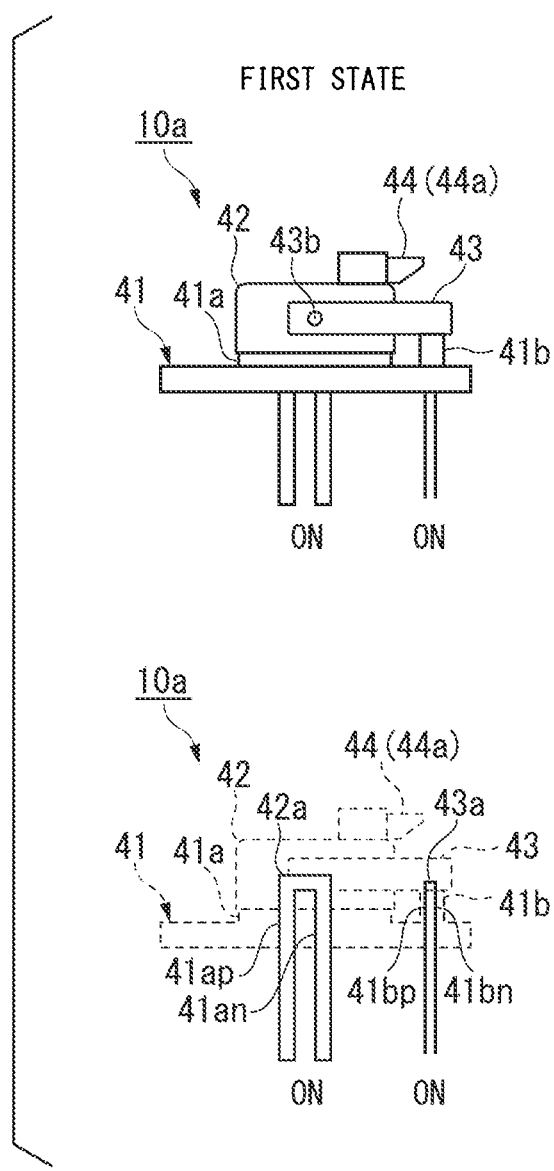
FIG. 2A is a diagram showing a first state of a circuit breaker of the same circuit breaker device.
Figure 2B:
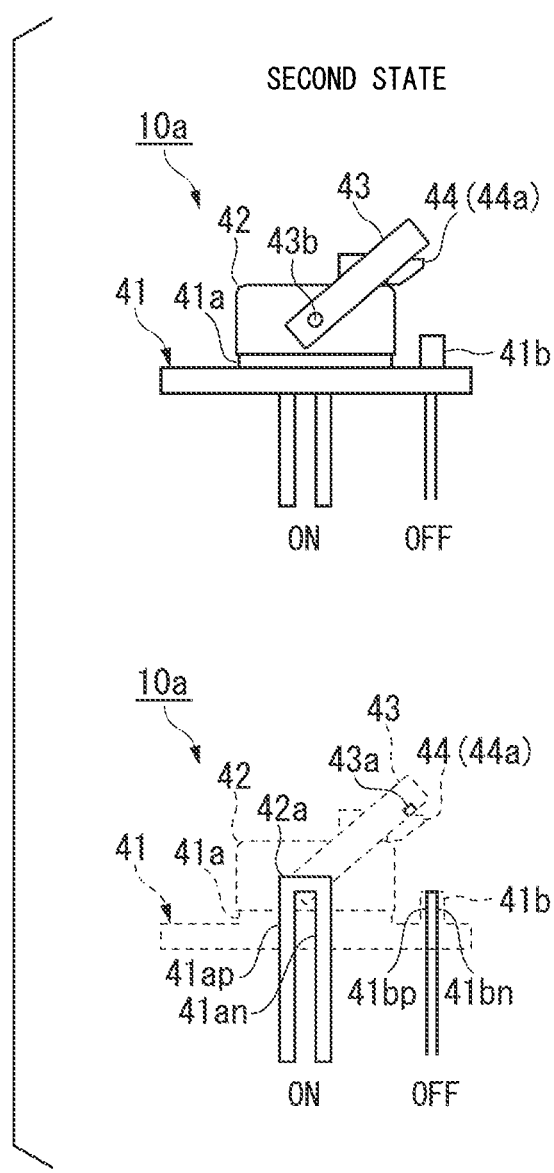
FIG. 2B is a diagram showing a second state of the circuit breaker of the same circuit breaker device.
Figure 2C:
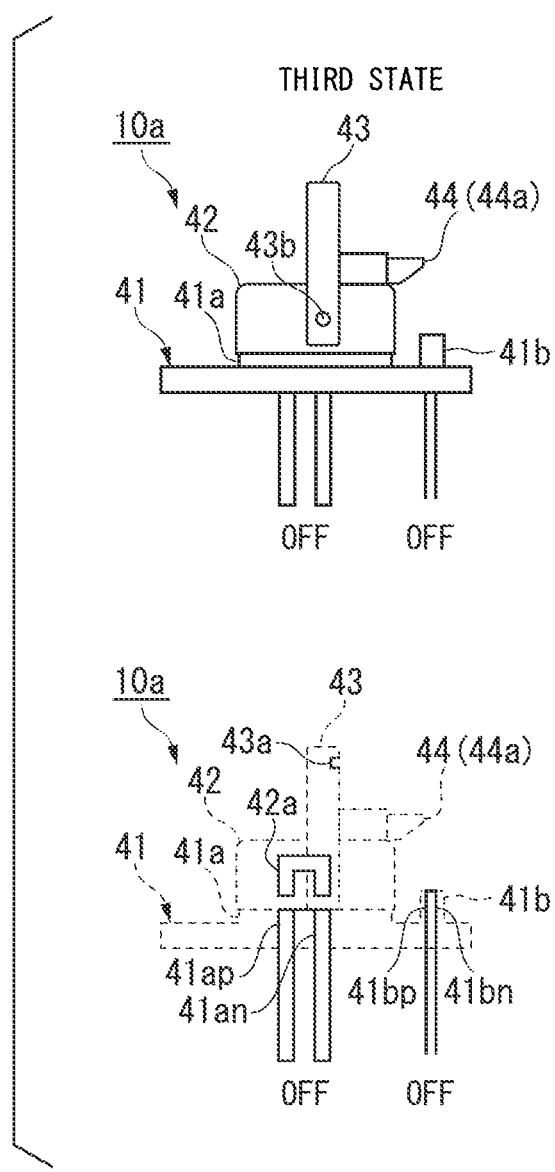
FIG. 2C is a diagram showing a third state of the circuit breaker of the same circuit breaker device.

The connector 43 switches, by means of rotation about the supporting point 43b, the state of the circuit breaker (service plug) 10a between the first state, for example shown in FIG. 2A, the second state, for example shown in FIG. 2B, and the third state, for example shown in FIG. 2C.

The first state is a state where the main body 42 is attached to the main body connection part 41a, and is a state where the pair of connector circuit terminals 41bp and 41bn are shorted by the connector shorting terminal 43a as a result of the pair of circuit terminals 41ap and 41an being shorted by the shorting terminal 42a and the connector 43 being attached to the connector connection part 41b.

The second state is a state where the main body 42 is attached to the main body connection part 41a, and is a state where the pair of connector circuit terminals 41bp and 41bn and the connector shorting terminal 43a are released as a result of the pair of circuit terminals 41ap and 41an being shorted by the shorting terminal 42a and the connector 43 being detached from the connector connection part 41b.

The third state is a state where the main body 42 is attached to the main body connection part 41a of the base part 41, and is a state where the pair of circuit terminals 41ap and 41an, and the shorting terminal 42a are released, and the pair of connector circuit terminals 41bp and 41bn of the connector connection part 41b and the connector shorting terminal 43a are released.

The connector 43 can shift, by means of rotation about the supporting point 43b, the state of the circuit breaker (service plug) 10a from the first state to the third state via the second state, or from the third state to the first state via the second state.

Figure 2D:
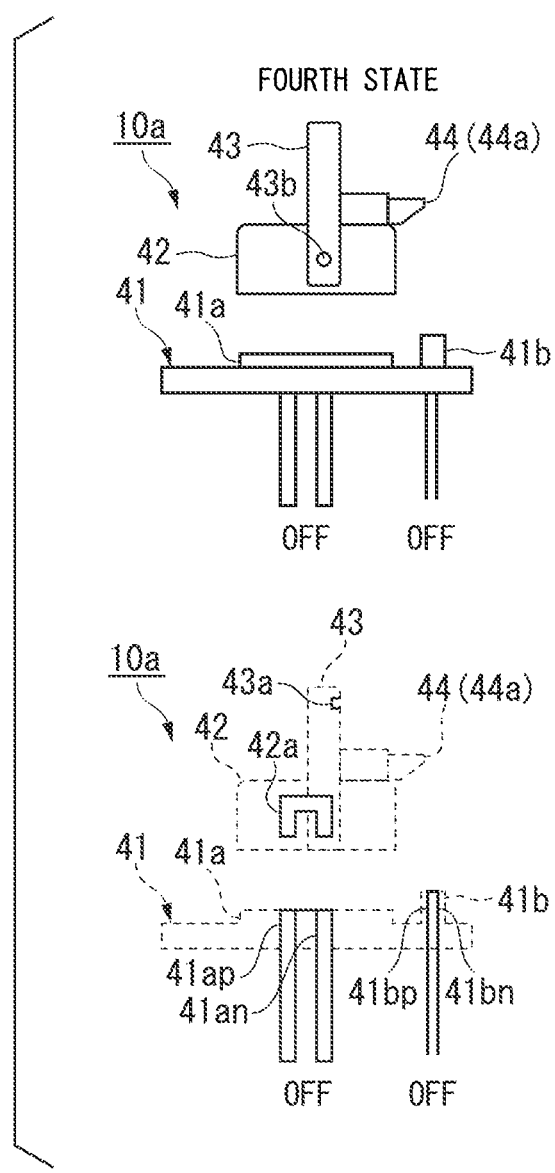
FIG. 2D is a diagram showing a fourth state of the circuit breaker of the same circuit breaker device.

If the main body 42 is detached from the main body connection part 41a of the base part 41 in the third state, the state of the circuit breaker 10a is brought to a fourth state shown in FIG. 2D.

The lock mechanism 44 is provided, for example, with a claw part 44a (restriction member) that projects outward from the main body 42 and that is capable of restricting rotation of the connector 43 about the supporting point 43b, and a biasing member (not shown in the figure) such as a spring that exerts elastic force on this claw part 44a and that makes the claw part 44a project outward from the main body 42.

The claw part 44a is formed so as to be able to come into contact with the connector 43 when the circuit breaker (service plug) 10a is in the second state while in the state of projecting outward from the main body 42. That is to say, the claw part 44a comes into contact with the connector 43 that rotates about the supporting point 43b in the manner of shifting the state of the circuit breaker (service plug) 10a from the first state to the third state or from the third state to the first state. The claw part 44a is formed so as to be able to be housed within the main body 42 when receiving an external force that resists the elastic force given by the biasing member. As a result, when the claw part 44a is housed within the main body 42, the contact between the claw part 44a and the connector 43 is released.

The claw part 44a is formed so that when the connector 43 that rotates about the supporting point 43b from the first state toward the third state is in contact, the claw part 44a receives, from the connector 43, a pressing force that houses the claw part 44a within the main body 42 (that is, a force that resists the elastic force given by the biasing member). On the other hand, the claw part 44a is formed so that when the connector 43 that rotates about the supporting point 43b from the third state toward the first state is in contact, the connector 43 does not give a pressing force that houses the claw part 44a within the main body 42.

Accordingly, when the connector 43 rotates about the supporting point 43b from the first state toward the third state, the claw part 44a that is in contact with the connector 43 is housed within the main body 42 in an automatic manner, and rotation of the connector 43 can continue. On the other hand, when the connector 43 rotates about the supporting point 43b from the third state toward the first state, the claw part 44a that is in contact with the connector 43 is not housed within the main body 42 automatically, and rotation of the connector 43 stops. In this case, for example, a pressing operation performed on the claw part 44a by an operator gives the claw part 44a an external force, and it is housed within the main body 42 in an automatic manner so as to allow rotation of the connector 43 to continue.

The circuit breaker device 10 of the present embodiment is provided with the above configuration. Next, a circuit breaker operation of the power supply system 1 that is provided with this circuit breaker device 10 is described.

First, hereunder there is described an operation of the power supply system 1 at normal time in which the circuit breaker (service plug) 10a is switched from the connection state to the disconnection state by an operation of the operator in a case where the power supply system 1 is instructed to stop by turning off the ignition switch of a vehicle having the power supply system 1 mounted thereon (IG-OFF), or is in a state where the power supply system 1 is already in the stop state.

Figure 3:
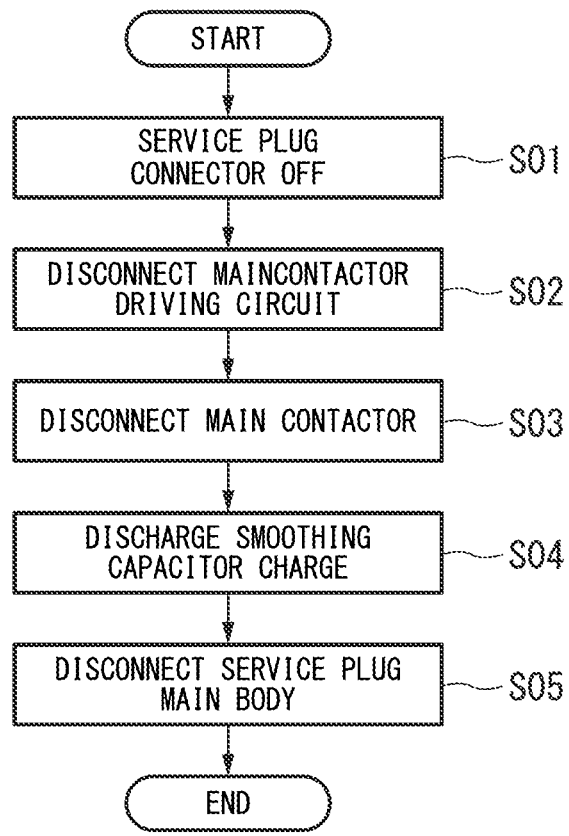
FIG. 3 is a flowchart showing a circuit breaker operation of the power supply system that is provided with the same circuit breaker device.
Figure 4:
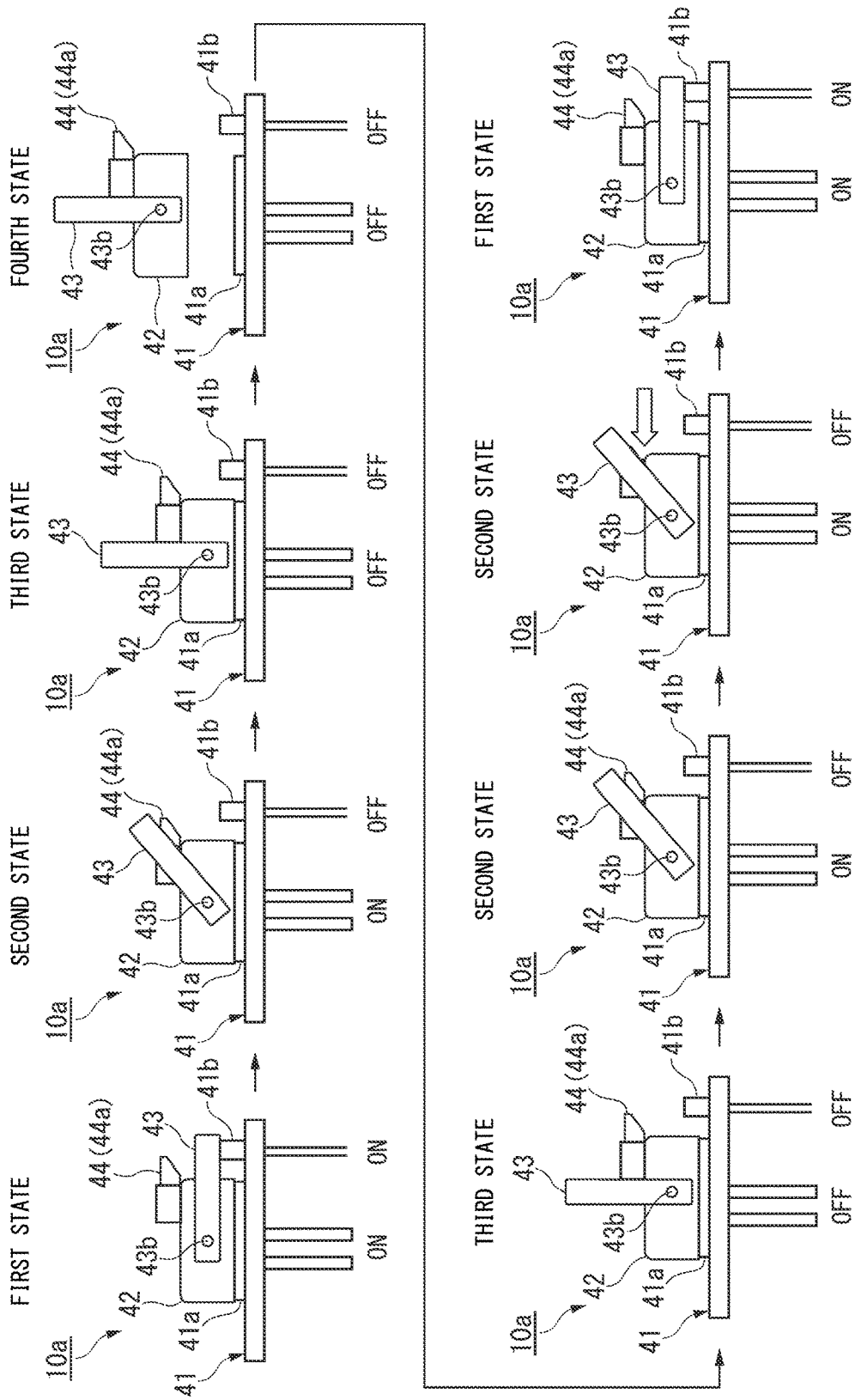
FIG. 4 is a diagram showing changes in the state of the circuit breaker in a circuit breaker operation of the power supply system that is provided with the same circuit breaker device.

First, in step S01 shown in FIG. 3, the connector 43, which has been attached to the connector connection part 41b of the base part 41, is detached from the connector connection part 41*b*, as a result of being rotated about the supporting point 43*b* by an operation of the operator. Then, the pair of connector circuit terminals 41*bp* and 41*bn* of the connector connection part 41*b* and the connector shorting terminal 43*a* are switched from the connection state (ON) to the release state (OFF). As a result, the state of the circuit breaker (service plug) 10*a* is shifted from the first state to the second state as shown in FIG. 4. At this time, when in contact with the claw part 44*a*, the connector 43 exerts on the claw part 44*a* a pressing force that houses the claw part 44*a* within the main body 42 (that is, a force that resists the elastic force given to the claw part 44*a* by the biasing member), to thereby house the claw part 44*a* within the main body 42 and allow rotation to continue.

In step S02 shown in FIG. 3, the connection between the 12V battery 12 and the driving circuit 19*c* of the main contactor part 19 is disconnected.

In step S03, the main contactors 19*a* and 19*b* of the main contactor part 19 are brought to the release (disconnection) state.

In step S04, the stop process of the control device 20 is started, and electrical charge in the smoothing capacitor 14*b* of the inverter 14 is discharged by means of control of the control device 20.

In step S05, as a result of the connector 43 being rotated about the supporting point 43*b* by an operation of the operator, the pair of circuit terminals 41*ap* and 41*an* of the main body connection part 41*a* and the shorting terminal 42*a* are switched from the connection state (ON) to the release state (OFF). As a result, the state of the circuit breaker (service plug) 10*a* is shifted from the second state to the third state as shown in FIG. 4. Then the process proceeds to end. At this point, the control device 20 has completed the stop process, and the control device 20 is in the stop state.

If the operator detaches the main body 42 from the main body connection part 41*a* of the base part 41 after this process from step S01 to step S05 has been executed, the state of the circuit breaker (service plug) 10*a* is shifted from the third state to the fourth state as shown in FIG. 4.

Then if the operator attaches the main body 42 to the main body connection part 41*a* of the base part 41, the state of the circuit breaker (service plug) 10*a* is shifted from the fourth state to the third state.

Then if the operator rotates the connector 43 about the supporting point 43*b*, the state of the circuit breaker (service plug) 10*a* is shifted from the third state to the second state. Then, the pair of circuit terminals 41*ap* and 41*an* of the main body connection part 41*a* and the shorting terminal 42*a* are switched from the release state (OFF) to the connection state (ON). At this time, when the connector 43 comes in contact with the claw part 44*a*, the connector 43 cannot house the claw part 44*a* within the main body 42, and rotation of the connector 43 is stopped. Here, when a pressing operation performed on the claw part 44*a* by the operator results in housing the claw part 44*a* within the main body 42, the connector 43 can rotate.

Then if the operator rotates the connector 43 about the supporting point 43*b* so that the connector 43 is attached on the connector connection part 41*b*, the state of the circuit breaker (service plug) 10*a* is shifted from the second state to the first state. At this time, the control device 20 activates, and before switching the main contactors 19*a* and 19*b* from the release (disconnection) state to the connection state, it controls the precharge part 18 to execute a predetermined precharge operation.

In the set of states shown in FIG. 4, when the power supply system 1 is already in the stop state, for example, in the case where the ignition switch of the vehicle with the power supply system 1 mounted thereon is already turned off (IG-OFF), the energization of the driving circuit 19 is being stopped by the control device 20. As a result, according to the rotation operation of the connector 43 performed by the operator, even in the case such as time t1 and t5 shown in FIG. 5 where connection (ON) and release (OFF) between the pair of connector circuit terminals 41*bp* and 41*bn* of the connector connection part 41*b* and the connector shorting terminal 43*a* are switched, the stop (OFF) state of energization in the driving circuit 19*c* is maintained. Furthermore, even in the case such as time t3 and t4 shown in FIG. 5 where connection (ON) and release (OFF) between the pair of circuit terminals 41*ap* and 41*an* of the main body connection part 41*a* and the shorting terminal 42*a* are switched, the stop (OFF) state of energization in the main contactors 19*a* and 19*b* is maintained.

Next, hereunder there is described an operation of the power supply system 1 at an abnormal time in which the circuit breaker (service plug) 10*a* is switched from the connection state temporarily to the disconnection state by an operation of the operator when the power supply system 1 is in the operating state with the ignition switch of a vehicle having the power supply system 1 mounted thereon turned on (IG-ON).

Figure 5:
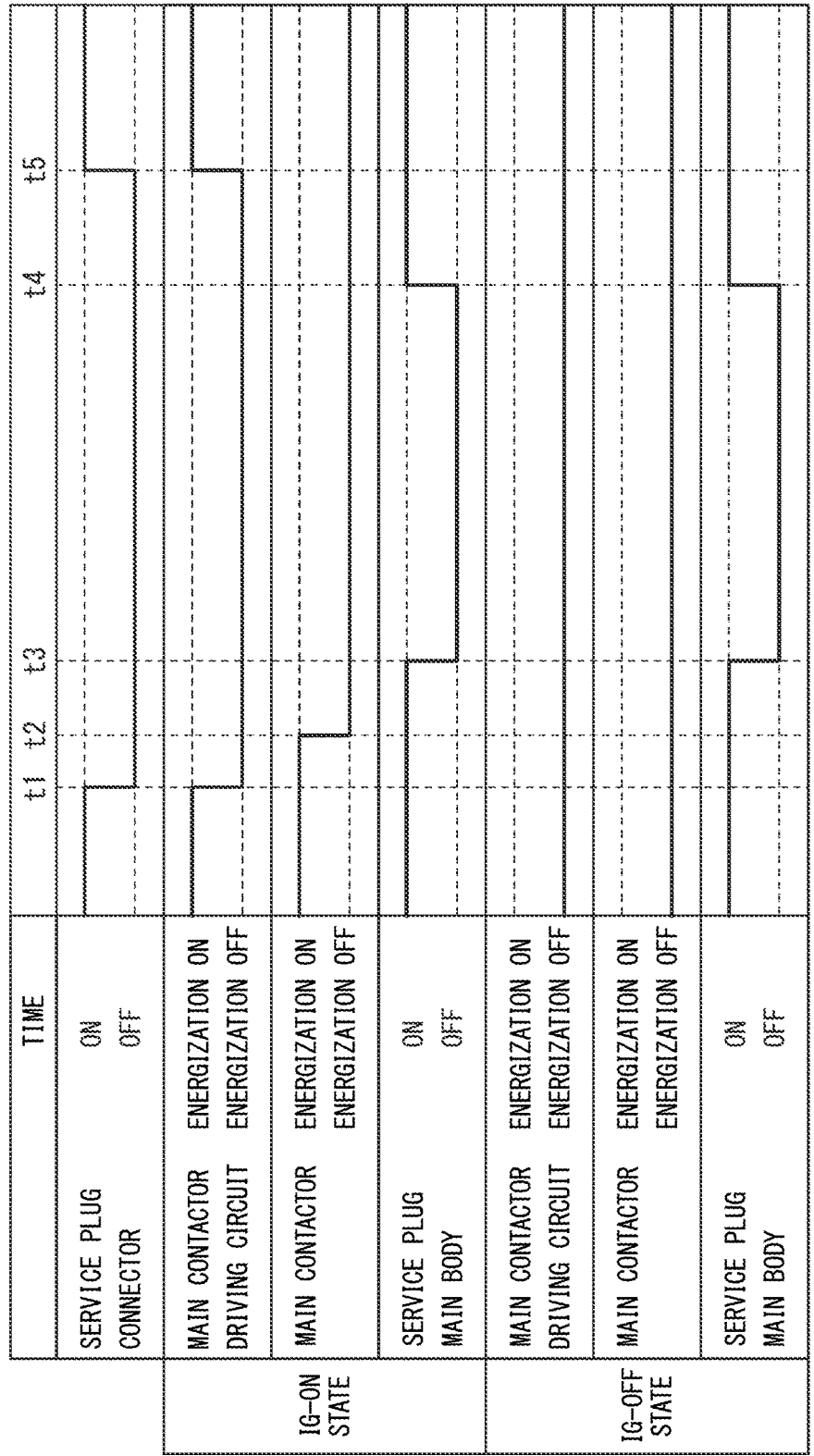
FIG. 5 is a diagram showing changes in the energization state (energization ON, OFF) of a driving circuit of a main contactor part and the main contactor, according to the state of the circuit breaker of the same circuit breaker device.

For example, as seen at time t1 shown in FIG. 5, when the connector 43, which has been attached to the connector connection part 41*b* of the base part 41 in the operating state of the power supply system 1, is detached from the connector connection part 41*b*, as a result of being rotated about the supporting point 43*b* by an operation of the operator, energization of the driving circuit 19*c* is stopped. Then, the state of the circuit breaker (service plug) 10*a* is shifted from the first state to the second state as shown in FIG. 4. At this time, when in contact with the claw part 44*a*, the connector 43 exerts on the claw part 44*a* a pressing force that houses the claw part 44*a* within the main body 42 (that is, a force that resists the elastic force given to the claw part 44*a* by the biasing member), to thereby house the claw part 44*a* within the main body 42 and allow rotation to continue.

Then as seen at time t2 shown in FIG. 5, energization in the driving circuit 19*c* being stopped causes the main contactors 19*a* and 19*b* to be switched from the connection state to the release (disconnection) state, and energization in the main contactors 19*a* and 19*b* is stopped.

Then, the stop process of the control device 20 is started, and electrical charge in the smoothing capacitor 14*b* of the inverter 14 is discharged by means of control of the control device 20.

Then as seen at time t3 shown in FIG. 5, when the pair of circuit terminals 41*ap* and 41*an* of the main body connection part 41*a* and the shorting terminal 42*a* are switched from the connection state (ON) to the release state (OFF) as a result of the connector 43 being rotated about the supporting point 43*b* by an operation of the operator, the state of the circuit breaker (service plug) 10*a* shifts from the second state to the third state as shown in FIG. 4. At this point, the control device 20 has completed the stop process, and the control device 20 is in the stop state.

Then for example, at time t3 or thereafter shown in FIG. 5, if the operator detaches the main body 42 from the main body connection part 41*a* of the base part 41, the state of the circuit breaker (service plug) 10*a* is shifted from the third state to the fourth state. Then if the operator attaches the main body 42 to the main body connection part 41*a* of the base part 41, the state of the circuit breaker (service plug) 10a is shifted from the fourth state to the third state as shown in FIG. 4.

Then as seen at time t4 shown in FIG. 5, when the pair of circuit terminals 41ap and 41an of the main body connection part 41a and the shorting terminal 42a are switched from the release state (OFF) to the connection state (ON) as a result of the connector 43 being rotated about the supporting point 43b by an operation of the operator, the state of the circuit breaker (service plug) 10a shifts from the third state to the second state as shown in FIG. 4. At this time, when the connector 43 comes in contact with the claw part 44a, the connector 43 cannot house the claw part 44a within the main body 42, and rotation of the connector 43 is stopped. Here, when a pressing operation performed on the claw part 44a by the operator results in housing the claw part 44a within the main body 42, the connector 43 can rotate.

For example, as seen at time t5 shown in FIG. 5, when the connector 43 is attached to the connector connection part 41b as a result of being rotated about the supporting point 43b by an operation of the operator, energization of the driving circuit 19c is started. Then, the state of the circuit breaker (service plug) 10a is shifted from the second state to the first state as shown in FIG. 4. At this time, the control device 20 activates, and before switching the main contactors 19a and 19b from the release (disconnection) state to the connection state, it controls the precharge part 18 to execute a predetermined precharge operation.

Incidentally, for example, as seen at time t1 shown in FIG. 5, in some cases, the operator may intend to re-attach the connector 43 to the connector connection part 41b immediately after the connector 43 having been detached from the connector connection part 41b by an operation of the operator.

Figure 6:
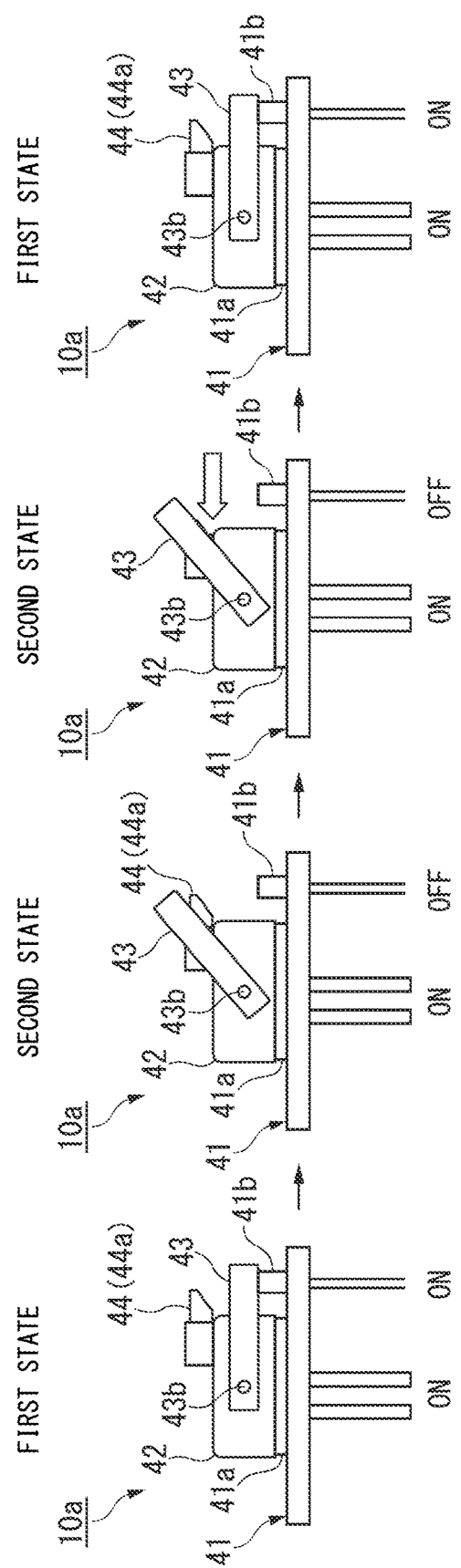
FIG. 6 is a diagram showing changes in the state of the circuit breaker in a circuit breaker operation of the power supply system that is provided with the same circuit breaker device.

In this case, first, if the operator operates the connector 43 to detach from the connector connection part 41b, the state of the circuit breaker (service plug) 10a is shifted from the first state to the second state and energization of the driving circuit 19c is stopped as shown in FIG. 6. At this time, the connector 43 rotates about the supporting point 43b so as to move over the claw part 44a while pushing the claw part 44a into the main body 42.

Then as seen at time t2 shown in FIG. 5, energization in the driving circuit 19c being stopped causes the main contactors 19a and 19b to be switched from the connection state to the release (disconnection) state, and energization in the main contactors 19a and 19b is stopped. Then, the stop process of the control device 20 is started, and electrical charge in the smoothing capacitor 14b of the inverter 14 is discharged by means of control of the control device 20.

Next, if re-attachment of the connector 43 to the connector connection part 41b is intended and the operation of the operator causes the connector 43 to rotate about the supporting point 43b, when the connector 43 comes in contact with the claw part 44a, the connector 43 cannot house the claw part 44a within the main body 42, and rotation of the connector 43 is stopped.

Then, when the operator performs a pressing operation on the claw part 44a and the claw part 44a is housed within the main body 42, the connector 43 can rotate, and the connector 43 is rotated about the supporting point 43b by the operation of the operator in this state, resulting in the connector 43 being re-attached to the connector connection part 41b. At this point, the control device 20 has completed the stop process, and the control device 20 is in the stop state. The control device 20 activates when the connector 43 is re-attached to the connector connection part 41b, and before switching the main contactors 19a and 19b from the release (disconnection) state to the connection state, it controls the precharge part 18 to execute a predetermined precharge operation.

That is to say, as a result of providing the claw part 44a, which can stop rotation of the connector 43 and can release the stopped rotation of the connector 43 with a pressing operation of the operator, the connector 43 is prohibited from being re-attached to the connector connection part 41b immediately after the connector 43 having been detached from the connector connection part 41b. As a result, it is possible to complete the stop process of the control device 20, which is executed after the main contactors 19a and 19b have been released (disconnected). Then it is possible to execute the predetermined precharge operation upon activation of the control device 20 after the connector 43 is re-attached to the connector connection part 41b. As a result, the amount of time required for the operation to press the claw part 44a can delay re-attachment of the connector 43, and it is possible to prevent the main contactors 19a and 19b from being immediately re-connected without the precharge operation being executed, while preventing excessively high current from flowing to the main contactors 19a and 19b.

As described above, according to the circuit breaker device 10 of the present embodiment, connection and release (disconnection) of the main contactors 19a and 19b can be switched according to attachment and detachment of the connector 43 to and from the connector connection part 41b, and connection and disconnection between the battery 11 and the circuit 21 can be appropriately switched without requiring cumbersome controls and complex configurations.

Furthermore, by providing the claw part 44a, it is possible to prevent the connector 43 from being easily re-attached to the connector connection part 41b. As a result, it is possible, for example, to complete the stop process of the control device 20, which is executed after the main contactors 19a and 19b have been released (disconnected). Moreover, it is possible to prevent a phenomenon from occurring in which excessively high current flows into the main contactors 19a and 19b as a result of the main contactors 19a and 19b being easily re-connected immediately after the battery 11 and the circuit 21 are switched from the connection state to the disconnection state by the main contactors 19a and 19b.

The present embodiment described above merely illustrates an example of carrying out the invention, and the embodiment should not be considered as limiting the invention.

DESCRIPTION OF REFERENCE SYMBOLS

10 Circuit breaker device
10a Circuit breaker
11 Battery (power supply)
12 12V battery
19 Main contactor part
19d Coil (driving part)
20 Control device
21 Circuit
41a Main body connection part
41ap, 41an Circuit terminal
41b Connector connection part
41bp, 41bn Connector circuit terminal
42 Main body
42a Shorting terminal
43 Connector
43a Connector shorting terminal
43b Supporting point
44a Claw part (restriction member)

The invention claimed is:

1. A circuit breaker device comprising: a power supply; a circuit that is connected to the power supply; a switch that is capable of switching between connection and disconnection between the power supply and the circuit; and a circuit breaker that is capable of disconnecting the power supply, wherein:

the switch is provided with a driving part that switches between connection and disconnection between the power supply and the circuit, according to an energization state; and the circuit breaker is provided with:

a main body connection part that has a pair of circuit terminals connected to the power supply;

a connector connection part that has a pair of connector circuit terminals involved in energization of the driving part;

a main body that can be attached to and detached from the main body connection part, and that has a shorting terminal capable of shorting the pair of circuit terminals in a state of being attached to the main body connection part;

a connector that can be attached to and detached from the connector connection part, and that has a connector shorting terminal that shorts the pair of connector circuit terminals when attached to the connector connection part; and a restriction member that restricts attachment of the connector to the connector connection part.

2. The circuit breaker device according to claim 1, wherein the restriction member is such that it is arranged between the connector being detached from the connector connection part and the connector connection part, and stops displacement of the connector by coming into contact with the connector that is displaced toward the connector connection part, and its contact with the connector is released by means of a predetermined external force acting thereon.

3. The circuit breaker device according to claim 2, wherein the connector can rotate about a supporting point supported by the main body, and this rotation switches between attachment to and detachment from the connector connection part, and the restriction member is supported on the main body so as to be able to be housed within the main body, it can be brought into contact with the connector that is detached from the connector connection part by being biased so as to project toward the outside of the main body, and it is housed within the main body by means of the external force against the biased force acting thereon.

4. The circuit breaker device according to claim 3, wherein the restriction member is housed within the main body by means of an external force acting thereon as a result of contact with the connector rotating in one direction, and it is not housed within the main body by means of an external force acting thereon as a result of contact with the connector rotating in the other direction.

* * * * *